United States Patent [19]
Mimnagh

[11] Patent Number: 5,835,462
[45] Date of Patent: *Nov. 10, 1998

[54] INFORMATION CARRIER FOR DIFFERENT RECORDING PROCESSES AND DEVICE FOR RECORDING THEREIN

[75] Inventor: Winslow M. Mimnagh, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 722,651

[22] Filed: Sep. 30, 1996

[30] Foreign Application Priority Data

Sep. 29, 1995 [BE] Belgium ............................... 09500809

[51] Int. Cl.⁶ ..................................................... G11B 7/00
[52] U.S. Cl. ......................................... 369/50; 369/275.3
[58] Field of Search ............................. 369/275.1, 275.2, 369/275.3, 275.4, 32, 48, 54, 50; 360/25, 27, 72.3, 73.06, 73.07, 73.11

[56] References Cited

U.S. PATENT DOCUMENTS

| | | | |
|---|---|---|---|
| 4,901,300 | 2/1990 | Van Der Zande et al. ............... | 369/47 |
| 5,187,699 | 2/1993 | Raaymakers et al. ..................... | 369/48 |
| 5,418,764 | 5/1995 | Roth et al. ............................... | 369/116 |
| 5,457,674 | 10/1995 | Watanabe et al. ........................ | 369/54 |
| 5,654,947 | 8/1997 | Roth et al. ............................... | 369/116 |

FOREIGN PATENT DOCUMENTS

| | | |
|---|---|---|
| 0397238A1 | 11/1990 | European Pat. Off. . |
| 0621588A1 | 10/1994 | European Pat. Off. . |
| 8901491 | 1/1991 | Netherlands . |

*Primary Examiner*—Nabil Hindi
*Attorney, Agent, or Firm*—Michael E. Belk

[57] ABSTRACT

Information carrier and recording device for recording an information carrier. The information carrier according to the invention is of an optically inscribable type, such as a CD-E or CD-WO. Information can be recorded as a track of patterns on the information carrier. The manufacturer has provided the information carrier with carrier information, for example, information about the write power to be used. It is desirable for the patterns to have constant dimensions, irrespective of the velocity at which they are recorded. The recording process in which for the recording is effected is therefore to be adapted to the recording velocity. In order to attune this adaptation to the information carrier, the latter contains velocity-related information indicative of the recording process related to a recording velocity, for example, a reference velocity (V1–V3), while the remaining recording parameters (W1–W3) are given for a minimum and/or maximum recording velocity at which the information carrier can be recorded. The device reads the velocity-related information from the information carrier and adapts the recording process to the recording velocity that must actually be used.

9 Claims, 3 Drawing Sheets

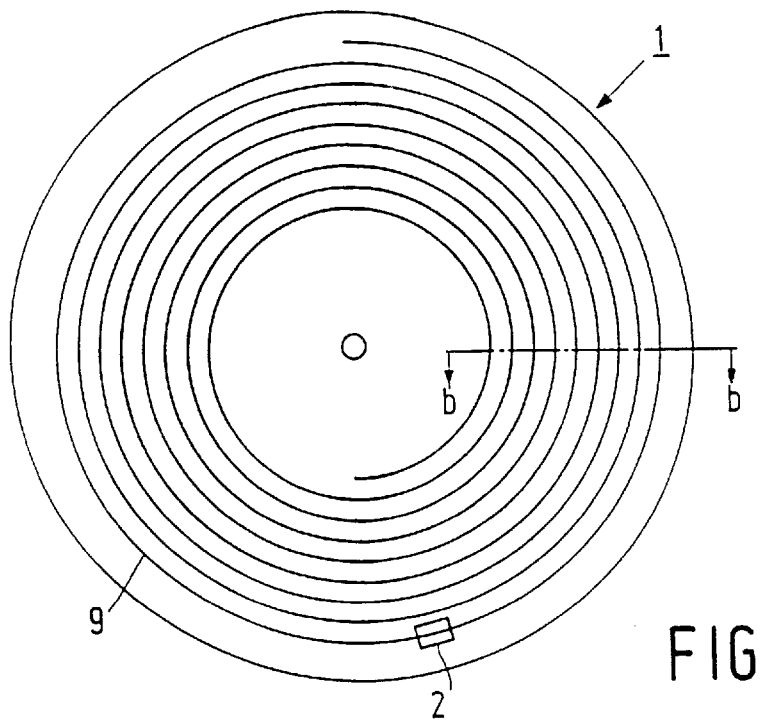
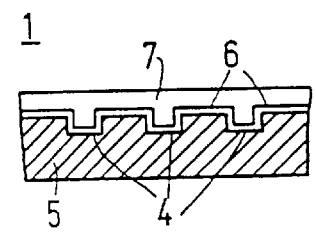
FIG.1b
FIG.1a
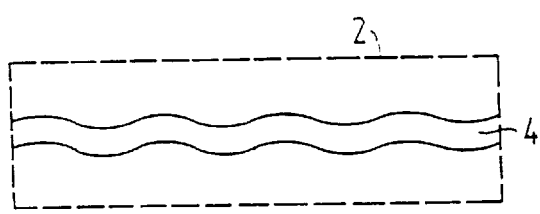
FIG.1c
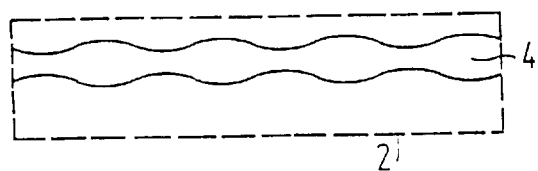
FIG.1d

INFORMATION CARRIER FOR DIFFERENT RECORDING PROCESSES AND DEVICE FOR RECORDING THEREIN

BACKGROUND OF THE INVENTION

The invention relates to an information carrier of an inscribable type containing recording information indicative of a recording process by which information can be recorded on the information carrier, the recording information comprising recording parameters of the recording process.

The invention further relates to a device for recording an information carrier of an inscribable type which information carrier contains recording information indicative of a recording process by which information can be recorded on the information carrier, the recording information comprising recording parameters of the recording process, the device comprising reading means for reading the recording information and recording means for recording the information carrier according to an actual recording process.

Such an information carrier and device are disclosed in published EP-A-0 397 238 to which U.S. Pat. No. 5,418,764 corresponds. This information carrier is a disc of an optically inscribable and readable type such as, for example, a Compact Disc Write Once (CD-WO) suitable for the CD system, and has a prerecorded track portion, a so-called pregroove. The pregroove is intended for recording optically readable patterns in accordance with the recording process, which patterns represent information. The pregroove is furthermore modulated with an auxiliary signal which contains address codes and auxiliary codes. The auxiliary codes comprise data necessary for recording, such as the write power necessary for the recording process. The known device comprises means for recovering auxiliary codes and for adapting the write power in response to the recovered auxiliary codes. During the recording process, the information carrier is rotated at such a velocity that the track moves at a fixed recording velocity relative to a recording position. The recording may be effected at a nominal recording velocity which is equal to a reading velocity customary in the system, such as, the nominal CD audio reading velocity in the CD system. A problem for the known information carrier and device is that, when the information carrier is recorded at a velocity that deviates from the nominal recording velocity, the recorded patterns may deviate from the patterns recorded at the nominal recording velocity.

SUMMARY OF THE INVENTION

It is an object of the invention to provide an information carrier and device in which deviating patterns which are recorded at a velocity that deviates from the nominal recording velocity are avoided.

For this purpose, the information carrier according to the invention is characterized in that the recording information comprises velocity-related information which is indicative of the recording process related to a recording velocity. For this purpose, the device according to the invention is characterized in that the recording means are arranged for controlling the actual recording process in dependence on an actual recording velocity as well as velocity-related information indicative of the recording process, while the recording information comprises the velocity-related information. These measures have the advantage, for example, that the recording process may be simply adapted in the device to the actual recording velocity, so that the patterns have substantially constant dimensions irrespective of the recording velocity. A further advantage is that the producer of the information carrier may enforce an adaptation of the recording process to the actual recording velocity on the respective information carrier. This is particularly advantageous if new developments make faster devices or information carriers that can be recorded faster possible after standardization agreements have been adopted.

An embodiment of the information carrier according to the invention is characterized in that the velocity-related information comprises a reference velocity at which the recording parameters are given. An embodiment of the device according to the invention is characterized in that the velocity-related information has a reference velocity at which the recording parameters are given, and in that the recording means are adapted for controlling the recording process in dependence on the difference between the reference velocity and the actual recording velocity. These measures are advantageous, for example, in that the device can read directly from the information carrier at what recording velocity the recording parameters are given. The device may then adapt either the actual recording velocity thereto or adapt the recording parameters proportionally to the difference between the actual recording velocity and the reference velocity.

A further embodiment of the information carrier according to the invention is characterized in that the velocity-related information has a range of recording velocities in which the recording parameters can be used. A further embodiment of the device according to the invention is characterized in that the velocity-related information has a range of recording velocities in which the recording parameters can be used and in that the recording means are adapted for selecting an actual recording velocity in dependence on the range of recording velocities. These measures are advantageous, for example, in that the device can read directly from the information carrier whether the recording velocity to be used lies in the range of velocities of the information carrier in which the other recording parameters can be used.

BRIEF DESCRIPTION OF THE DRAWINGS

These and other aspects of the invention will be apparent from and elucidated with reference to the drawing, in which:

FIGS. 1a–d shows an information carrier of an inscribable type,

DESCRIPTION OF THE PREFERRED EMBODIMENTS

Figure 2:
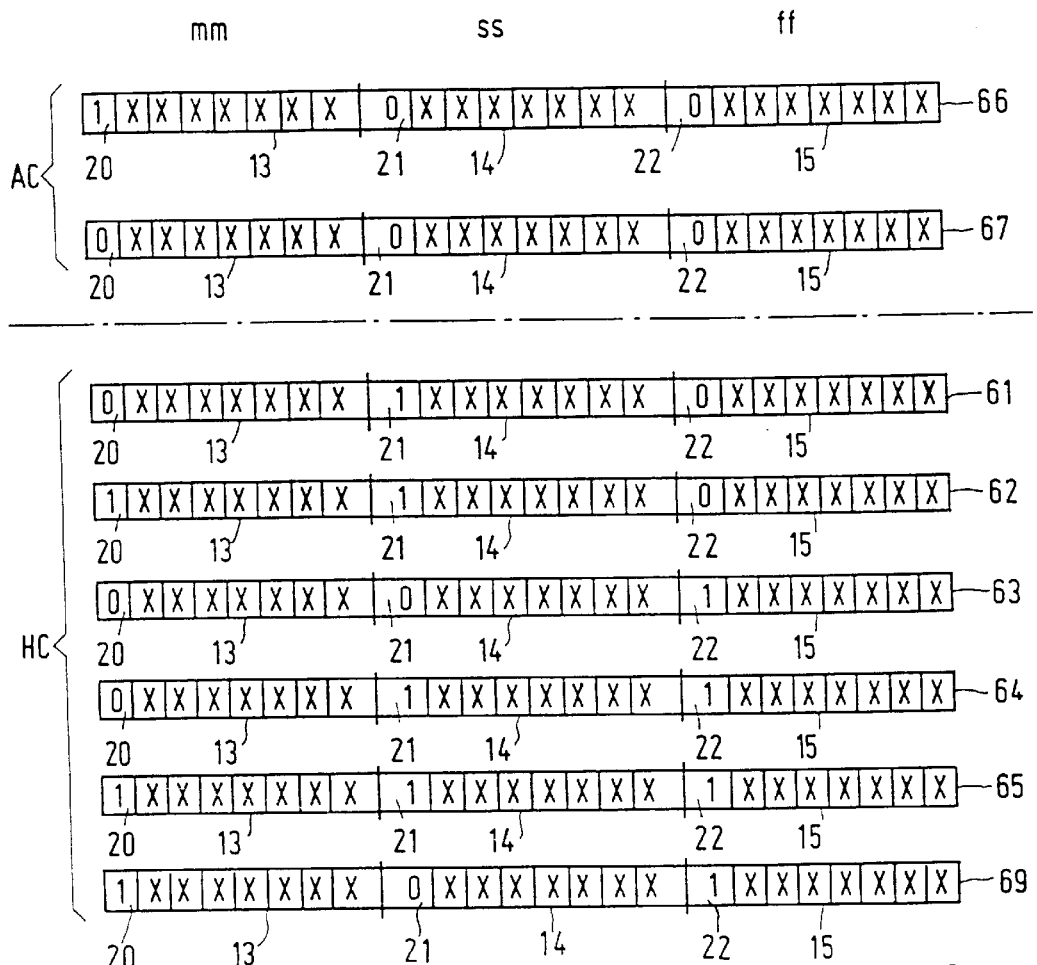
FIG. 2 shows a suitable format for carrier information.

FIG. 1a shows a disc-shaped information carrier 1. The information carrier has a continuous track 9 intended for recording, which is arranged in a helical pattern of windings. The windings may also be arranged concentrically instead of helically. The track 9 is indicated on the information carrier by a servo pattern in which, for example, a pregroove portion 4 enables a read/write head to follow the track 9 during scanning. A servo pattern may be, for example, alternatively uniformly distributed sub-patterns which periodically cause signals to develop in a servo tracking system. FIG. 1b shows a section along line b—b of the information carrier 1, in which a substrate 5 is covered by a pick-up layer 6 and a transparent layer 7. The pregroove portion 4 may also be formed as a raised part or as a material property differing from its surroundings. The pick-up layer 6 can be inscribed optically or magnetooptically by an information recording device. Information on the information carrier is represented by patterns of indicia. For the formation of the patterns in track 9, a recording process is used in which each indicium is formed by one or more recording pulses of constant or varying write power depending on, for example, the length of the indicium. The recording parameters of the recording process, such as the write power, the number of pulses, the variation, the duty cycle and so on are to be tuned optimally to the information carrier, while the material properties of this information carrier play an important role. An example of an inscribable record carrier is the known CD Write Once or CD-MO for computer-use. An extensive description of the inscribable CD system that similarly comprises carrier information, may be found in U.S. Pat. No. 4,901,300 and U.S. Pat. No. 5,187,699. A description of the reading of a CD and the use of a pregroove portion can be found in the title "Principles of optical disc systems" by Bouwhuis et al., ISBN 0-85274-785-3.

FIGS. 1c and 1d show two examples of a periodic modulation (wobble) of the pregroove portion. This wobble causes an additional signal to arise in a servotracking pick-up. The wobble is, for example, frequency-modulated with an auxiliary signal and carrier information is coded in the auxiliary signal. A description of an information carrier having such recording information may be found in EP-0 397 238 mentioned hereinbefore. Information carriers of a different type, such as, for example, an optical tape, may be provided with recording information in a different manner, for example, by realizing an information area at the beginning of the tape or along an auxiliary track.

On the information carrier according to the invention, the recording information comprises velocity-related information. The shape of the indicia is to be substantially independent of the recording velocity used. For example, with an increased recording velocity and recording parameters which further remain constant, indicia of different dimensions will be formed. Since thermal effects play a role in the recording process, an adaptation of the recording parameters which is generally proportional to the velocity difference is insufficient to obtain indicia of the same dimensions. In order to obtain the same dimensions, the recording process will have to be further adapted to the recording velocity. This especially holds for phase change materials which are used in rerecordable and erasable information carriers such as the CD erasable (CD-E) on which the recording process is to be carried out within close tolerances. For the information carrier according to the invention, the velocity-related information thereto expresses a relation between the recording process and the recording velocity. As a result, either the recording velocity may be adapted, or the recording process may be adapted in dependence on the actual recording velocity and the velocity-related information.

FIG. 2 shows a suitable format for carrier information as this information is recorded as successive bits in the auxiliary signal in the pregroove portion in an embodiment of the information carrier according to the invention. A 24-bit-long unit is used, subdivided into 3 bytes. The carrier information includes, for example, address codes AC and auxiliary codes HC, which address codes AC indicate the position of a read part of the track 9 relative to the beginning of the track in minutes mm in bit positions 13, seconds ss in bit positions 14 and frames ff in bit positions 15, as is customary in the CD system. This Absolute Time Indication In the Pregroove (ATIP) is expressed in the Binary Coded Decimal (BCD) system. The auxiliary codes HC are distinguished from the address codes AC by specific values in designated bit positions 20, 21 and 22 which form the Most Significant Bits (MSB) of the time codes. The address codes AC 66, 67 contain 000, 100 respectively, in these three MSBs; the auxiliary codes HC 61, 62, 63, 64, 65 and 66 have the remaining values 010, 110, 001, 011, 111 and 101. Needless to observe that the velocity-related information may be provided differently on the information carrier, for example, in the form of a bar code which is provided on the information carrier at a given location and can be read by a recording device.

Figure 3:
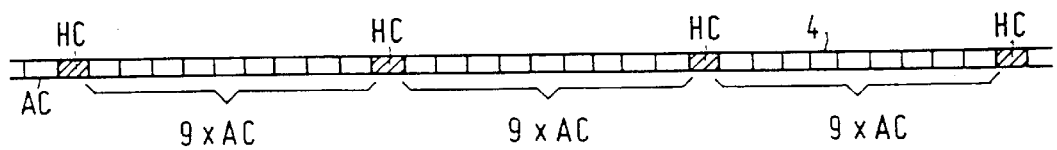
FIG. 3 gives a diagrammatic representation of a part of the track in which carrier information is coded.

FIG. 3 diagrammatically shows a part of the track 9 in which the carrier information is coded. The auxiliary signal contains, in essence, address codes AC and an auxiliary code HC in one in ten possible codes. The auxiliary codes HC comprise recording information that relates to the information carrier 1 such as, for example, possible beginnings and ends of the Lead-In and Lead-Out areas, or recording parameters of the recording process, such as the necessary write power of the radiation beam. In an embodiment of the invention, several bits in a specific auxiliary code HC are used for denoting a reference velocity, whereas the other recording parameters are fixed. As a result, it is possible to optimize an information carrier at a velocity, for example, double velocity that deviates from the customary standard velocity. At this velocity the manufacturer of the information carrier then measures the remaining recording parameters and records them on the carrier. The second embodiment has a range of recording velocities in which the recording parameters can be used and for which the information carrier is suitable. The range of velocities may be denoted by both a minimum and a maximum velocity, but it is also possible that only a minimum or maximum velocity is given. The actual recording velocity is to lie in the range. If the nominal recording velocity is deviated from, a correction may be applied to the recording parameters, as required. In a third embodiment, in which the recording parameters are given for a first recording velocity, further recording parameters are given which are calculated at least at a further recording velocity that deviates from the first recording velocity. During the recording operation, one of the recording velocities may be used for which parameters are available on the disc. In a fourth embodiment, in which the recording parameters are given at a first recording velocity, correction parameters which are indicative of a deviation from the recording parameters at a second recording velocity are included. As a result, a correction may be calculated for the recording parameters in dependence on a difference between the first recording velocity and a recording velocity used. In a fifth embodiment, in which the recording process is determined at a first recording velocity, the process information is included. This process information denotes that at certain recording velocities that deviate from the first recording velocity, a different recording process is to be used. In this respect, there may be indicated, for example, that a preheating pulse or an entirely different series of pulses is to be applied at a certain deviating recording velocity.

Naturally, a combination of said embodiments of velocity-related information on an information carrier is possible. By providing such auxiliary codes on the information carrier several times with, for example, different reference velocities, different recording parameters and possibly different recording processes may be indicated at different reference velocities or, for example, different wavelengths of the recording radiation source.

Figure 4:
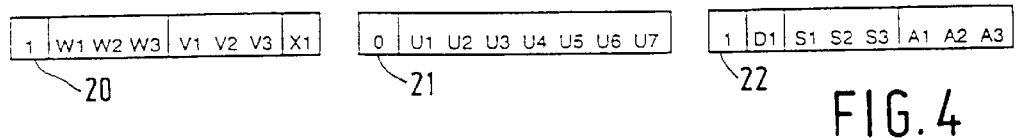
FIG. 4 shows recording information with velocity-related information.

FIG. 4 shows an example of recording information with velocity-related information. It has the format of an auxiliary code described with reference to FIG. 2, in which code 101, in MSB positions 20, 21, 22, denotes that the remaining bits of the respective auxiliary code HC contain velocity-related information according to an agreed format. This may be filled, for example, as follows: W1–W3 denotes the number of mW of write power with a wavelength of 785 nm at 25° C. at reference velocity, while 000 denotes 5 mW, 001=6 mW and so on; V1–V3 the reference velocity, 000= unspecified, 001=1× nominal CD velocity, 010=2× nominal CD velocity, 011=4× nominal CD velocity, and so on; U1–U7 denotes the purpose of the disc, 0000000=general use, and so on; D1 denotes the type of disc, 0=CD-WO, 1=CD-Erasable. The bits S1–S3 and A1–A3 may be used to denote a sub-type while a different recording process may be established, as required, for each sub-type. The type of disc and sub-type may also be used for adapting the format in which the remaining parameters are transferred. For example, a CD-WO will require a different recording process with different recording parameters from a CD-E. The meaning of the various bits in the auxiliary codes may thus be rendered dependent on the type/sub-type of disc indicated. Even within the CD-E it is possible that different physical embodiments and choices of material are used for which different recording processes are necessary. The respective processes may also depend on the recording velocity.

Figure 5:
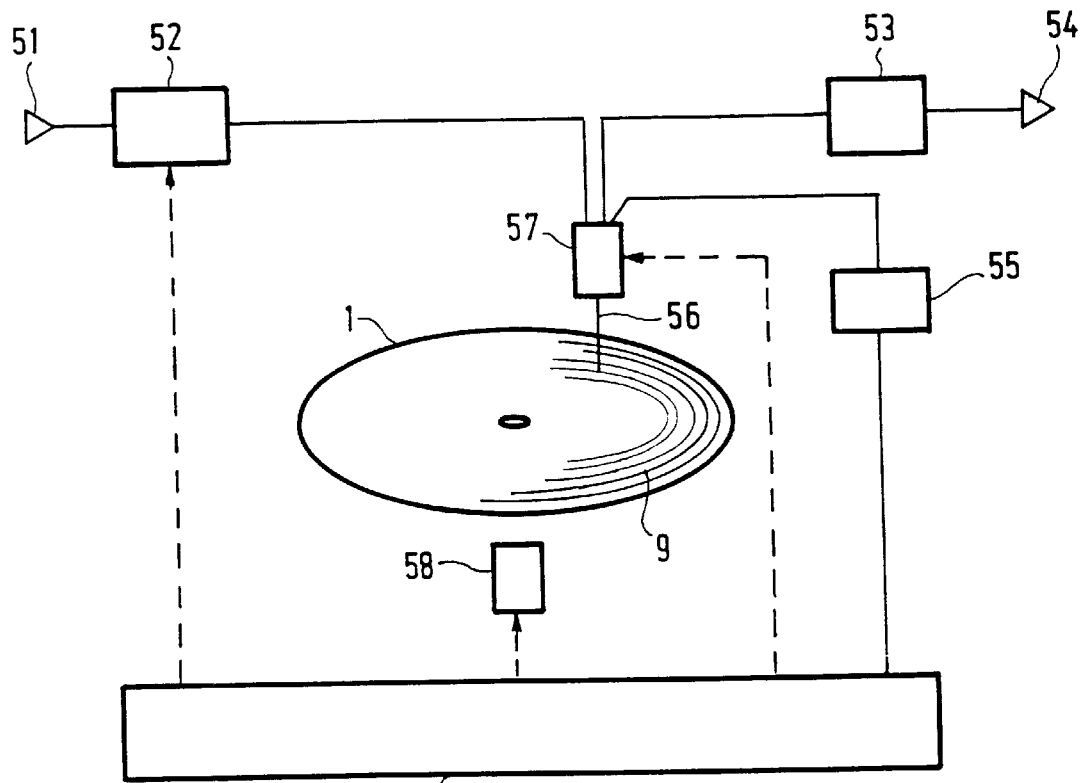
FIG. 5 shows a device for recording the information carrier, and FIG. 6 gives a diagrammatic representation of an adaptation procedure. (In the drawing Figures, elements corresponding to elements already described, carry like reference characters).

FIG. 5 shows a device for recording a disc-shaped information carrier 1. The device comprises coding means 52 and a read/write unit 57 for recording the information carrier 1 in accordance with a recording process. Information is applied to input 51 and converted in coding means 52 into a recording signal. The recording signal is coupled to the read/write unit 57. The information carrier 1 rotates, driven by drive means 58. The read/write unit 57 meanwhile scans track 9 via beam 56 and records patterns of indicia that represent information in the track. During scanning, the read/write unit 57 is positioned over the track 9 by a servo system of a customary type (not shown). The system controller 59 checks the scanning of the information carrier 1 via drive means 58 and the servo system. The system controller 59 likewise controls the recording process via the coding means 52 and the read/write unit 57. Generally, such a device will also comprise decoding means 53 for recovering the information from the patterns which are read out by the read/write unit 57. The recovered information is then produced on the output 54. The device further includes demodulator means 55 for recovering the recorded information. The servo signals generated during the following of the track are applied to demodulator means 55 which are arranged for demodulating the servo signals for the recovery of the auxiliary signal. The demodulator means 55 convert the address codes and the auxiliary codes from the auxiliary signal, which codes are transferred to the system controller 59. The recording parameters of the recording process are adapted by the system controller 59 in accordance with an adaptation procedure (see FIG. 6) as a function of the recording velocity and the recovered recorded information, among which velocity-related information. For example, the write power used can be set in read/write unit 57 and the shape of the recorded signal can be set in coding means 52.

Figure 6:
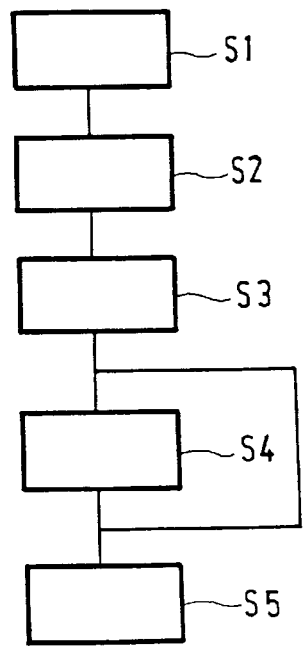

FIG. 6 gives a diagrammatic representation of an adaptation procedure as carried out in the following steps by the system controller 59:

S1, start of the scanning operation: After an information carrier has been inserted into the device, the information carrier 1 start rotating and the servo system locks on.

S2, reading of recorded information: A given part of the track is scanned. The demodulator 55 reads the recorded information, among which the velocity-related information.

S3, adaptation of the recording process: The recording parameters are calculated from the recording velocity desired for a recording instruction and the recorded information read from the information carrier.

S4, calibration of the recording process: If necessary, one or more trial recordings are made on an area intended for this purpose on the information carrier with different settings of the recording parameters.

S5, the recording process: the recording command is executed. Subsequent commands may be executed next until the information carrier is removed from the device. In that case the adaptation procedure is to be resumed at S1.

In the case where the velocity-related information has a reference velocity at which the recording parameters are given, S3 is executed as follows. The difference between the reference velocity and the actual recording velocity is given. If these velocities are the same, the read recording parameters are suitable at once and S4 follows. In the case of a difference, the recording parameters may be corrected by a fixed value if this correction value for the respective type of information carrier is known. It is also possible to adapt the recording velocity.

In the case where the recording parameters are given at a first recording velocity, and where the velocity-related information has further recording parameters which are given at least at a further recording velocity which deviates from the first recording velocity, S3 is executed as follows. One of the given velocities is selected, that is, the velocity that deviates the least from the desired recording velocity. The attendant recording parameters and an actual recording velocity are set and S4 follows.

In the case where the velocity-related information has a recording velocity range in which the recording parameters can be used, S3 is executed as follows. If the desired recording velocity lies within the range, S4 may follow at once. If not, the actual velocity is to be selected to lie within the range. In many cases the maximum possible velocity will be desired, and will be simply obtained in this manner. If the information carrier is of the type for which different velocity ranges with different attendant recording parameters are available, the velocity-related information is naturally to be read for such a period of time that all available velocity limits are found. Subsequently, a selection may be made for the range in which the desired recording velocity lies.

In the case where the recording parameters are given at a first recording velocity and where the velocity-related information comprises correction parameters indicative of a deviation from the recording parameters at a second recording velocity, S3 is executed as follows. The difference between the first recording velocity and the recording velocity to be used is determined. The correction parameters are then applied to the recording parameters in proportion to the velocity difference between the second recording velocity and the actual recording velocity. For example, if a correction parameter is given for four times as high a velocity, and the device can only cope with a velocity that is twice as high, the correction will have to be halved.

In the case where the recording process is determined at a first recording velocity and where the velocity-related information comprises process information indicative of at least a further recording process at a recording velocity that deviates from the first recording velocity, S3 is executed as follows. If the desired recording velocity corresponds to a deviating velocity, for which a different recording process is given, the respective recording process is selected. If necessary, in the second instance there may still be a correction of the recording parameters of the selected process in one of the manners described above.

I claim:

1. An information carrier of the inscribable type comprising:

a spiral or circular track in which additional information may be inscribed in a recording process using optical or opto-magnetic means; and recording information means pre-recorded in the track and which can be read from the track, and including:
   recording parameters of the recording process; and
   velocity-related information including a range of recording velocities for which the recording parameters can be used in the recording process and for which the information carrier is suitable.

2. The information carrier of claim 1 in which the velocity-related information includes a maximum recording velocity.

3. The information carrier of claim 1 in which the velocity-related information includes a minimum recording velocity.

4. The information carrier of claim 1 in which:

the recording parameters are given at a first recording velocity; and the velocity-related information includes correction parameters indicating a deviation of the recording parameters at a second recording velocity for correcting the recording parameters depending on a difference between the first recording velocity and a recording velocity used in the process.

5. The information carrier of claim 1 in which:

first recording parameters are given for a first recording velocity; and second recording parameters are given for a second recording velocity.

6. A device for recording information on a record carrier of an inscribable type, comprising:

reading means for reading prerecorded information from the record carrier including:
   recording parameters of a recording process; and
   velocity-related information including a range of recording velocities for which the recording parameters can be used in the recording process and for which the information carrier is suitable;

recording means for selecting a recording velocity for use depending on the range of recording velocities read from the record carrier and for controlling the recording process depending on the selected recording velocity and the recording parameters read from the record carrier.

7. The device of claim 6 in which:

the velocity related information includes a maximum recording velocity; and the recording means are for selecting the maximum recording velocity as the selected recording velocity.

8. The device of claim 6 in which:

the recording parameters are given at a first recording velocity;

the velocity-related information includes correction parameters indication a deviation of the recording parameters at a second recording velocity for correcting the recording parameters depending on a difference between the first recording velocity and the selected recording velocity; and the recording means are for controlling the recording process depending on the correction parameters and the selected recording velocity.

9. The device of claim 6 in which:

the recording process is determined for a first recording velocity;

the velocity-related information includes process information for a further recording process at a recording velocity that deviates from the first recording velocity; and the recording means are for selecting an actual recording process depending on the process information and the selected recording velocity.

* * * * *